United States Patent
Sharifie et al.

(10) Patent No.: US 10,019,161 B2
(45) Date of Patent: Jul. 10, 2018

(54) OUT OF ORDER MEMORY COMMAND FETCHING

(71) Applicant: SanDisk Technologies LLC, Plano, TX (US)

(72) Inventors: Tal Sharifie, Beer Sheva (IL); Shay Benisty, Beer Sheva (IL); Amir Turjeman, Beer Sheva (IL)

(73) Assignee: SanDisk Technologies LLC, Addison, TX (US)

(*) Notice: Subject to any disclaimer, the term of this patent is extended or adjusted under 35 U.S.C. 154(b) by 0 days.

(21) Appl. No.: 14/928,384

(22) Filed: Oct. 30, 2015

(65) Prior Publication Data
US 2017/0060422 A1 Mar. 2, 2017

Related U.S. Application Data

(63) Continuation-in-part of application No. 14/841,094, filed on Aug. 31, 2015, now Pat. No. 9,703,716.

(51) Int. Cl.
*G06F 12/00* (2006.01)
*G06F 3/06* (2006.01)
*G06F 13/42* (2006.01)

(52) U.S. Cl.
CPC .......... *G06F 3/0604* (2013.01); *G06F 3/0629* (2013.01); *G06F 3/0688* (2013.01); *G06F 13/4282* (2013.01)

(58) Field of Classification Search
CPC .. G06F 3/0604; G06F 13/4282; G06F 3/0688; G06F 3/0629
USPC ......................................... 711/102, 103, 115
See application file for complete search history.

(56) References Cited

U.S. PATENT DOCUMENTS

| | | | | |
|---|---|---|---|---|
| 2003/0056034 A1* | 3/2003 | Olds | ..................... | G06F 3/0601 710/5 |
| 2007/0028060 A1* | 2/2007 | Ware | ........................ | G11C 5/14 711/154 |
| 2010/0011137 A1* | 1/2010 | McGowan | ............ | G06F 13/385 710/105 |
| 2011/0145474 A1* | 6/2011 | Intrater | ................. | G06F 13/385 711/103 |
| 2011/0191527 A1* | 8/2011 | Fukuda | .................... | G06F 12/02 711/103 |
| 2012/0272043 A1* | 10/2012 | Nuechterlein | ........ | G06F 9/3851 712/205 |
| 2014/0059270 A1* | 2/2014 | Zaltsman | ................ | G06F 3/061 711/103 |
| 2015/0134857 A1* | 5/2015 | Hahn | ...................... | G06F 3/061 710/5 |
| 2016/0283111 A1* | 9/2016 | Guo | ........................ | G06F 3/061 |

* cited by examiner

*Primary Examiner* — Tuan Thai
*Assistant Examiner* — Tasnima Matin
(74) *Attorney, Agent, or Firm* — Vierra Magen Marcus LLP

(57) ABSTRACT

A system and method that allows out of order fetching of host non-volatile memory commands can improve and maximize the memory device performance. The memory device can examine the non-volatile memory command headers available in the non-volatile memory command queue to select one or more, non-volatile memory commands to be fetched, in an optimum order and executed according to currently available resources in the memory device. The memory device can optimize performance of the non-volatile memory commands by re-ordering the host commands fetched from the host memory.

16 Claims, 7 Drawing Sheets

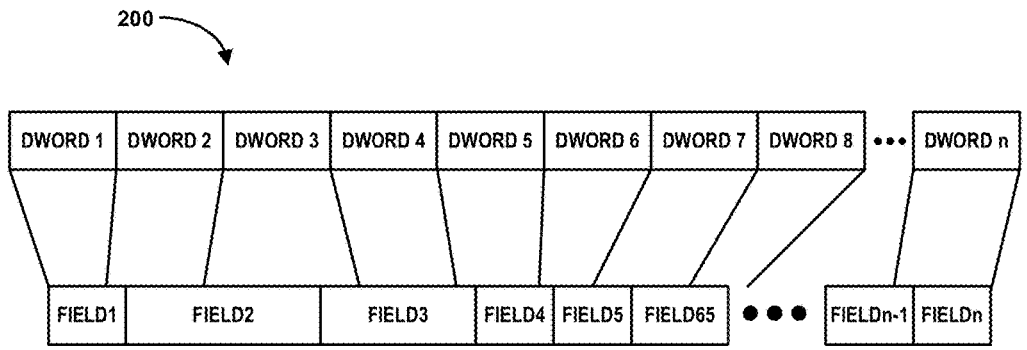

FIG. 2

| FIELD | DESCRIPTION |
|---|---|
| 63:00 | STARTING LBA (SLBA): This field indicates the 64-bit address of the first logical block to be read as part of the opertion. Command Dword 10 contains bits 31:00; Command Dword 11 contains bits 63:32 |
| 31 | LIMITED RETRY (LR): If set to '1', the controller should apply limited retry efforts. If cleared to '0', the controller should applu all available error recovery means to return the data to the host. |
| 30 | FORCE UNIT ACCESS (FUA): This field indicates that the data read shall be returned from non-volatilie media. There is no implied ordering with other commands |
| 29:26 | PROTECTION INFORMATION FIELD (PRINFO): Specifies the protection information action and check field, as defined in Figure 156 |
| 25:16 | RESERVED |
| 15:00 | NUMBER OF LOGICAL BLOCKS (NLB): This field indicates the number of logical blocks to be read. This is a 0's based value. |

FIG. 3

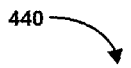

| BIT | DESCRIPTION |
|---|---|
| 31:16 | COMMAND IDENTIFIER (CID): This field specifies a unique identifier for the non-volatile memory command when combined with a Submission Queue Identifier. |
| 15:14 | PRP or SGL for Data Transfer (PSDT): This field specifies whether PRPs or SGLs are used for any data transfer associated with the non-volatile memory command. PRPs are used for Admin type non-volatile memory commands.<br><br>| VALUE | DEFINITION |<br>|---|---|<br>| 00b | PRPs are used for this transfer |<br>| 01b | SGLs are used for this transfer |<br>| 10b | SGLs are used for this transfer |<br>| 11b | RESERVED |<br><br>If there is metadata that is not interleaved with the logical block data, as specified in the format of the non-volatile memory command, the the metadata pointer (MPTR) field is used to point to the metadata. The definition of the metadata pointer field is dependent on the setting in this field. |
| 13:10 | RESERVED |
| 09:08 | FUSED OPERATION (FUSE) This field indicates the present non-volatile memory command is part of a complex non-volatile memory command created by fusing together two simpler commands. This field also specifies the sequence of the fused commands:<br><br>| VALUE | DEFINITION |<br>|---|---|<br>| 00b | Normal operation |<br>| 01b | Fused operation, first command |<br>| 10b | Fused operation, second command |<br>| 11b | RESERVED | |
| 07:00 | OPCODE (OPC): This field specifies the opcode of the non-volatile memory command to be executed |

FIG. 4B

OUT OF ORDER MEMORY COMMAND FETCHING

CROSS REFERENCE TO RELATED APPLICATIONS

This application is a continuation-in-part of and claims priority from U.S. patent application Ser. No. 14/841,094 filed Aug. 31, 2015 and entitled "Partial Memory Command Fetching," published as US 2017/0060749 on Mar. 2, 2017 and issued as U.S. Pat. No. 9,703,716 on Jul. 11, 2017, which is incorporated herein by reference in its entirety.

FIELD OF THE INVENTION

The present invention relates generally to memory systems, and more particularly, to methods and systems for fetching memory commands from a host computer system.

BACKGROUND

Non-volatile memory systems include a non-volatile memory controller and the non-volatile memory storage media. A host computer system issues and places one or more non-volatile memory commands in memory command queues. The memory command queues are allocated portions of the host computer system's memory. The host computer also notifies a non-volatile memory controller that the non-volatile memory commands are available to be fetched in the memory command queues.

The non-volatile memory controller fetches the commands in a serial order that the host computer system issued the non-volatile memory commands in the memory command queues. The non-volatile memory controller fetches the new memory command from the memory command queues and starts to perform a flow of operations for processing and executing the fetched memory command. Each operation involving different processes of firmware code (CPU) and/or hardware modules. Examples for such processes include, but not limited to: preparing memory buffers, memory address mapping scheme for translating LBA address to physical memory block address, decoding schemes for decoding data, arbitration logic for fetching data from the non-volatile memory storage and sending a completion indication back to the host computer system and others.

The non-volatile memory controller requires all the information needed to perform each memory command and the command must be fully fetched. Unfortunately, the memory command fetching encumbers the end protocol of the host computer system, such as the size of the memory command store in the non-volatile memory system, and can significantly slow the throughput of data to and from the non-volatile memory system.

SUMMARY

Broadly speaking, the present invention can increase the throughput of data into and out of the non-volatile memory system. It should be appreciated that the present invention can be implemented in numerous ways, including as a process, an apparatus, a system, computer readable media, or a device. Several inventive embodiments of the present invention are described below.

One implementation provides a non-volatile memory system including a memory device coupled to a memory command queue in a host computer system via a data communication bus, the memory command queue including multiple memory commands issued to the memory command queue in a first order. The memory device includes multiple memory dies, each of the memory dies including a corresponding multiple set or sets of non-volatile memory cells. The memory device also includes a command fetching engine with an out of order selection module. The out of order selection module includes logic for examining the memory commands in the memory command queue, identifying an available resource in the memory device, identifying a memory command in the memory command queue corresponding to the identified available memory resource in the memory device and fetching the identified memory command in a second order independent of the first order of the identified memory command in the memory command queue the fetched memory commands are then processed by the memory device in the second order.

The out of order fetching process can also include combining two or more fetched memory commands to produce a combined memory command and processing the combined memory command as a single memory command. The two or more fetched memory commands can be read, write or admin memory commands. The two or more fetched memory commands can be memory commands directed to a selected one of the memory dies. Examining the of memory commands in the memory command queue includes logic for examining one or more fields included in each one of the memory commands. The fields included in each one of the memory commands can include one or more of a command field, a data transfer type field, a fused operation field or an opcode field.

Another implementation provides a method of fetching memory commands from a memory command queue in a host computer system. The method includes receiving a notification in a memory device that multiple memory commands have been issued to the memory command queue in a first order, examining the memory commands in the memory command queue, identifying an available resource in the memory device, identifying a memory command in the memory command queue corresponding to the identified available memory resource in the memory device, fetching the identified memory command in a second order independent of the first order of the identified memory command in the memory command queue and processing the fetched memory commands in the second order.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2 is a memory command, for implementing embodiments of the present disclosure.

FIG. 3 is a table of example fields from a memory command, for implementing embodiments of the present disclosure.

FIG. 4B illustrates an example non-volatile memory command header (DW0) fields, for implementing embodiments of the present disclosure.

DETAILED DESCRIPTION

Figure 1:
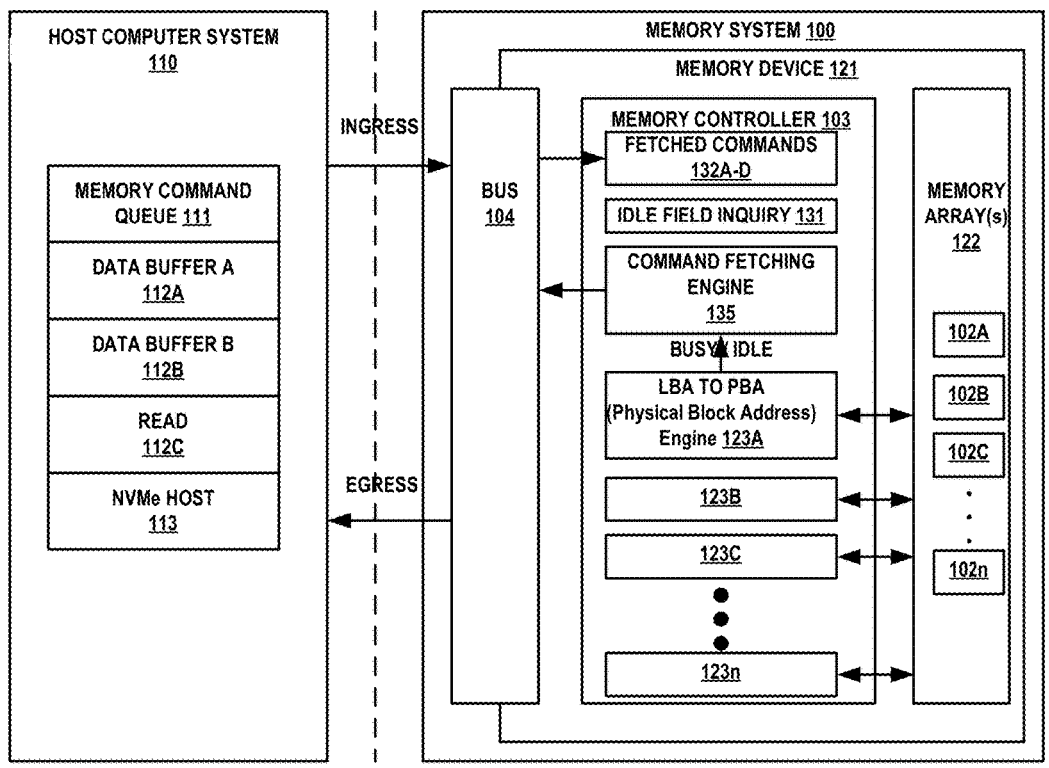
FIG. 1 is a block diagram of a memory system, for implementing embodiments of the present disclosure

Several exemplary embodiments for increasing the throughput of data into and out of non-volatile memory systems by using an out of order fetching regime for fetching non-volatile memory commends from the non-volatile memory command queue will now be described. It will be apparent to those skilled in the art that the present invention may be practiced without some or all of the specific details set forth herein.

The host computer system does not know which non-volatile memory device resources are available at any given time and thus cannot issue non-volatile memory commands in an order optimized for the currently available non-volatile memory device resources. Out of order fetching of host non-volatile memory commands can improve and maximize the memory device performance in several different manners as described herein. The memory device can examine the non-volatile memory command headers available in the non-volatile memory command queue to select the best one, or more, non-volatile memory commands to be fetched and executed according to currently available resources in the memory device. The memory device can optimize performance of the non-volatile memory commands by re-ordering the host commands fetched from the host memory.

The host computer system can include multiple non-volatile memory command submission queues and multiple non-volatile memory command completion queues. The host computer system places new, non-volatile memory commands in multiple non-volatile memory command submission queues and notifies the memory device that the new memory commands are available using a doorbell. The memory device fetches the non-volatile memory commands from the various non-volatile memory submission queues, in the desired order corresponding to the available resources of the memory device. The fetched non-volatile memory commands are then executed by the memory device in the desired order.

In a typical host computer system, the non-volatile memory commands are required to be fetched in order from any given one of the multiple non-volatile memory command submission queues. As disclosed herein, the memory non-volatile commands in a given non-volatile memory command submission queue can be fetched in the order selected by the memory device such as based on the status of the internal resources of the memory device. The memory device can also fetch non-volatile memory commands from multiple different non-volatile memory command submission queues based on the status of the internal resources of the memory device.

The host computer system does not know which non-volatile memory device resources are available at any given time and thus cannot issue non-volatile memory commands in an order optimized for the currently available non-volatile memory device resources. Out of order fetching of host non-volatile memory commands can improve and maximize the memory device performance in several different manners as described herein. The memory device can examine the non-volatile memory command headers available in the non-volatile memory command queue to select the best one, or more, non-volatile memory commands to be fetched and executed according to currently available resources in the memory device. The memory device can optimize performance of the non-volatile memory commands by re-ordering the host commands fetched from the host memory.

One implementation is an out of order non-volatile memory command select method. The out of order non-volatile memory command select method includes reading non-volatile memory command headers and other metadata of the memory commands available in the non-volatile memory command submission queue in the host computer system. The non-volatile memory command submission queue can be included in the memory system of the host computer system. The non-volatile memory commands are parsed to examine the metadata of each of the non-volatile memory commands. The metadata includes the characteristics of the respective non-volatile memory command. The non-volatile memory commands can be reordered and/or combined according to the memory device priority and availability. Additional, non-volatile memory commands can be fetched according to the memory device priority. The memory device controller can maintain a list of the fetched non-volatile memory commands such as when the non-volatile memory command is fetched and performed out of order from the non-volatile memory command queue.

Non-volatile memory commands include information for selecting a command for execution in the command header. By way of example, the first word DW0, includes a command ID, a command type (e.g., read/write/admin/other, etc.), an indication for a fused command, and a PRP (physical region pages) or SGL (scatter-gather lists) indication. The non-volatile memory command size is typically 64 Bytes. The base address of the host system's non-volatile memory command queue is known by the memory device and thus the memory device can fetch the command header, DW0, of all available commands in the non-volatile memory command queue, select the best non-volatile memory command for execution and then fetch the selected non-volatile memory command for execution.

In one implementation, out of order fetching and execution can include fetching only selected portions or fields of a non-volatile memory command from the memory command queues rather than requiring fetching the complete non-volatile memory command. The fetched portion is just enough to assist one or more different processes required of the non-volatile memory system controller such as may be required for serving the fetched commands, making better decisions, or making sure the hardware modules executing these processes are fully utilized as much as possible while minimizing idle, unused time.

The fetched, selected portions of the non-volatile memory command can be used for activating an idle hardware and/or firmware module for running these processes in advance. The resulting improved utilization on the end protocol (such as PCIe) by postponing the fetching of the reminder of the command to a time when the bus (PCIe) is otherwise idle. Fetching only the selected portions of the non-volatile memory command will also improve the time needed to complete execution of each non-volatile memory command.

Some examples for hardware modules that execute such non-volatile memory processes may include central processing unit (CPU), hardware accelerators, logical block address (LBA) to physical block address (BPA) translation logic, buffer management, among other hardware modules. In another example, if two non-volatile memory commands require continuous data, then performing some of these processes (e.g. buffer management, address translation, data reads, etc.) ahead of time can save time when accessing the non-volatile storage media such as flash memory or other types of non-volatile memory cell storage media.

In one implementation, identifying an idle processes and/or idle hardware module in the non-volatile memory system that is involved in the servicing of already fetched non-volatile memory commands. The hardware logic can include an interrupt function to raise and interrupt when in idle state occurs and indicate the idle state to the non-volatile memory controller. The non-volatile memory controller can then fetch portions of non-volatile memory commands that are required to put the idle process or idle module into operation. A state machine, CPU code or another system or method could be for determining which portions of the non-volatile memory command are required by the idle processes or idle modules. This allows activating the idle processes and modules in advance with the selected pre-fetched portions of the commands, thereby reducing the processing load and reducing latency times when servicing the non-volatile memory storage media with the remainder of the non-volatile memory command.

FIG. 1 is a block diagram of a memory system 100, for implementing embodiments of the present disclosure. The memory system 100 is coupled to or included as part of a host computer system 110. The memory system 100 includes one or more memory devices 121. The memory device 121 includes a memory array 122. The memory array 122 includes many memory cells arranged in logical blocks 102A-n of memory cells (e.g., memory blocks 102A-n). The memory device 121 can also include a bus 104, such as a PCIe bus, for communicating with the host computer system 110.

The memory device 121 also includes a command fetching engine 135, multiple fetched command queues 132A-D, an idle field inquiry logic block 131 and a physical block address engine 123A for calculating LBA to PBA conversions. The physical block address engine 123A is merely an example logical process block that can benefit from the improved performance described herein and the memory device 121 can also include additional process logic blocks 123B, 123C-123n. Each of the logical process blocks 123A-n can be implemented in hardware, firmware, software and combinations of two or more of hardware, firmware and software.

The process logic blocks 123A-n can include hardware, firmware and software implemented logic and devices for performing the internal operations of the memory device 121. Some examples of internal operations performed by the process logic blocks 123A-n include controlling the memory device 121 such as a memory control unit, a processor, an application specific integrated circuit (ASIC), random access memory buffers, buffer allocation, prefetching data (such as from the memory array 122 for read commands), reading and preparing PRP lists (such as from host computer system or local buffers), fetching name space information, and memory controller logic. Optionally, one or more of the process logic blocks 123A-n can be part of a memory controller 103. The memory controller 103 can be coupled to one or more memory arrays 122.

In one implementation, the logical process block 123B includes a processor and process logic block 123C includes the memory controller logic. The memory controller logic 123C can include interfacing protocols between the memory controller 103 and the memory blocks 102A-n and between the memory system 100 and the host computer system 110. The memory controller logic 123C can include software, hardware and firmware that is executable by the processor 123B.

The memory blocks 102A-n can include non-volatile memory (NVM) such as flash memory (e.g., NAND flash) and other types of memory such as NOR, ORNAND, 3D memory and charge trapping memory with material such as silicon nitride, and phase change memory such as ReRAM, and semi-volatile memory such as DRAM and SRAM. The memory blocks 102A-n can also include volatile type memory circuits. The volatile type memory circuits can include, as an example, dynamic random access memory (DRAM) and static random access (SRAM) memory circuits.

Referring again to FIG. 1, the host computer system 110 can include non-volatile memory command submission queue 111 for storing the non-volatile memory commands issued by the host computer system 110. The host computer system 110 can also include data buffer A 112A and data buffer B 112B for storing data to be transferred to and from the memory system 100. There can be many configurations and uses of the data buffer A 112A and data buffer B 112B. By way of example, the data buffer A 112A and data buffer B 112B can physically be a single buffer or physically two or more buffers. In another configuration, the data buffer A 112A and data buffer B 112B can be more than one physical buffer that is utilized logically as a single data buffer that can be flexible in size to accommodate a the data needed to be transferred between the host computer system 110 and the memory system 100 and from the memory system to the host computer system. The host computer system 110 can also include a read module 112C and a non-volatile memory host module 113. It should be understood that the host computer system 110 can include additional data buffers in addition to the data buffer A 112A and data buffer B 112B.

FIG. 2 is a memory command 200, for implementing embodiments of the present disclosure. The memory command 200 can have a length of as much as 64 bytes or even more. The memory command 200 includes multiple Dwords1-$n$. Each of the Dwords1-$n$ can have a respective length of 4 bytes. Each of the Dwords1-$n$ have one or more fields or portions of fields as shown. Each of the fields from Field1 to Fieldn have their respective lengths ranging from as little as one bit to as much as several bytes. For example, Field1 could be a single bit flag and Field2 can be an address spanning two or more Dwords and Field3 can be a data field spanning two or more Dwords or even more. It should be noted that the fields Field1-$n$ are not drawn to scale relative to the Dwords1-$n$.

The memory command 200 can be used for several different functions including, for examples: data address translation, categorizing commands such as write, read, short read, long read commands. Other example memory commands include being part of a stream of commands. The memory command 200 can also include error detection, encryption and decryption commends. The memory command 200 can also allocate buffers. Memory command 200 can also perform administrative functions such as adjusting power level, fetching scattered data tables and determining memory attributes. It should be noted that the foregoing are merely non-exclusive lit of example memory commands.

FIG. 3 is a table 300 of example fields from a memory command, for implementing embodiments of the present disclosure. The table 300 lists the bit location and a description of each of the fields within the memory command 200. The description can also include a length of each of the fields within the memory command 200. These are example fields and many different types of information and format of the fields can be included in the memory command 200.

FIGS. 2 and 3 depict an example usage of pre-fetching of selected portions, such as one or more fields, of the non-volatile memory command for activating the address translation logic in ahead of time to thereby obtain the actual physical block address on the non-volatile memory that is used by the reminder of the memory command. It should be understood that this is only an example and that the disclosed embodiments are not limited to the address translation and any other processes and operations can also be improved to substantially eliminate idle processes and modules as described in the disclosed embodiments.

In the address translation example it is presumed that the address translation logic in the non-volatile memory controller determines the actual physical block addresses (PBA) based on the selected logical block address (SLBA) and number of logical blocks (NLB) fields of the non-volatile memory command issued by the host computer system. The SLBA and NLB portions of the non-volatile memory command, when taken together, indicate to the address translation logic which logical block addresses (LBAs) are required for the read operation. This calculation can require a significant amount of time as the calculation can require accessing the non-volatile memory storage media such as for reading tables stored in the non-volatile memory system and other operations such as reading, analyzing and saving the analysis results of PRP/SGL tables and many other non-volatile memory operations. PRP/SGL tables are two formats (PRP and SGL) of lists pointing to chunks of data. Before a memory device can actually read the data, the memory device must need to read where the data resides. The memory command may not have enough space to cover the actual location of the data. The buffer with (for writes) or for (reads) the data can be scattered (SGL=scatter-gather-list) in many locations in the host memory.

The foregoing described implementations of partial non-volatile memory command fetching as one approach to out of order fetching of non-volatile memory commands from the host memory command submission queue 111. In other implementations, the out of order fetching of non-volatile memory commands include fetching entire non-volatile memory commands from the host memory command submission queue 111 in an order independent of the order in which the host computer system 110 issued the non-volatile memory commands to the host memory command submission queues. There are many advantages to fetching the memory commands out of order including improved utilization of the resources within the memory device. These advantages can provide faster over all operations, lower power consumption over time, simplified design of the memory device and lower operating costs and production costs.

Figure 4A:
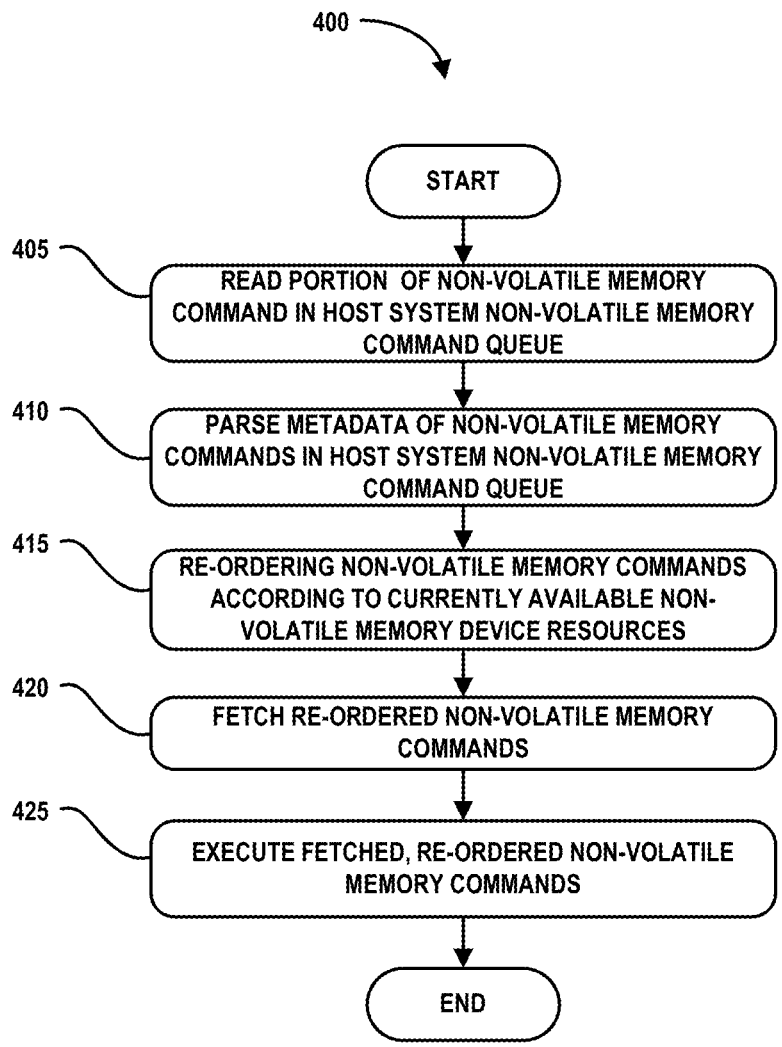
FIG. 4A is a flowchart diagram that illustrates the method operations performed in out of order fetching of host non-volatile memory commands, for implementing embodiments of the present disclosure.

FIG. 4A is a flowchart diagram that illustrates the method operations 400 performed in out of order fetching of host non-volatile memory commands, for implementing embodiments of the present disclosure. The operations illustrated herein are by way of example, as it should be understood that some operations may have sub-operations and in other instances, certain operations described herein may not be included in the illustrated operations and may occur in an order other than as depicted herein. With this in mind, the method and operations 400 will now be described.

In an operation 405, the memory device 121 reads a portion of the non-volatile memory commands from the non-volatile memory command queue 111 of the host computer system 110. In one example, the portion of the non-volatile memory command can be the DW0 field in order to classify the command. In an operation 410, the memory device 121 parses the read portions of the non-volatile memory commands to examine the metadata content of each of the non-volatile memory commands. The metadata of each of the non-volatile memory commands identifies non-volatile memory resources that are needed for each of the non-volatile memory commands. By way of example, the metadata may identify that the command is a read, write, admin or some other process type command.

In an operation 415, the memory device 121 identifies the currently available non-volatile memory resources and re-orders the non-volatile memory commands to correspond with the currently available non-volatile memory resources. In an operation 420, the re-ordered, non-volatile memory commands are fetched into the memory device 121, where the re-ordered the non-volatile memory commands are executed in an operation 425.

FIG. 4B illustrates an example non-volatile memory command header (DW0) fields 440, for implementing embodiments of the present disclosure. The non-volatile memory command header (DW0) fields 440 can include a command opcode field in bits 0-7, a fused operation field in bits 08-09, reserved field in bits 10-13, PRP or SGL data transfer type field in bits 14-15, and command identifier field in bits 16-31. The command opcode field in bits 0-7 provide an indication of the type of memory command such as a read, write or admin type memory command. The fused operation field in bits 08-09 provide an indicator that two simple non-volatile memory commands are fused together and the sequence of each of the fused non-volatile memory commands. The PRP or SGL data transfer type field in bits 14-15 indicate whether the command includes a data transfer or not and whether the data transfer is to be according to the PRP or the SGT data transfer parameters. The command identifier field in bits 16-31 may be used to specify a unique non-volatile memory command identifier combined with the submission queue identifier. Each of these fields of the non-volatile memory command header (DW0) assist the memory device 121 in identifying the memory device resources needed for each of the non-volatile memory commands, as will be described in more detail below.

Figure 4C:
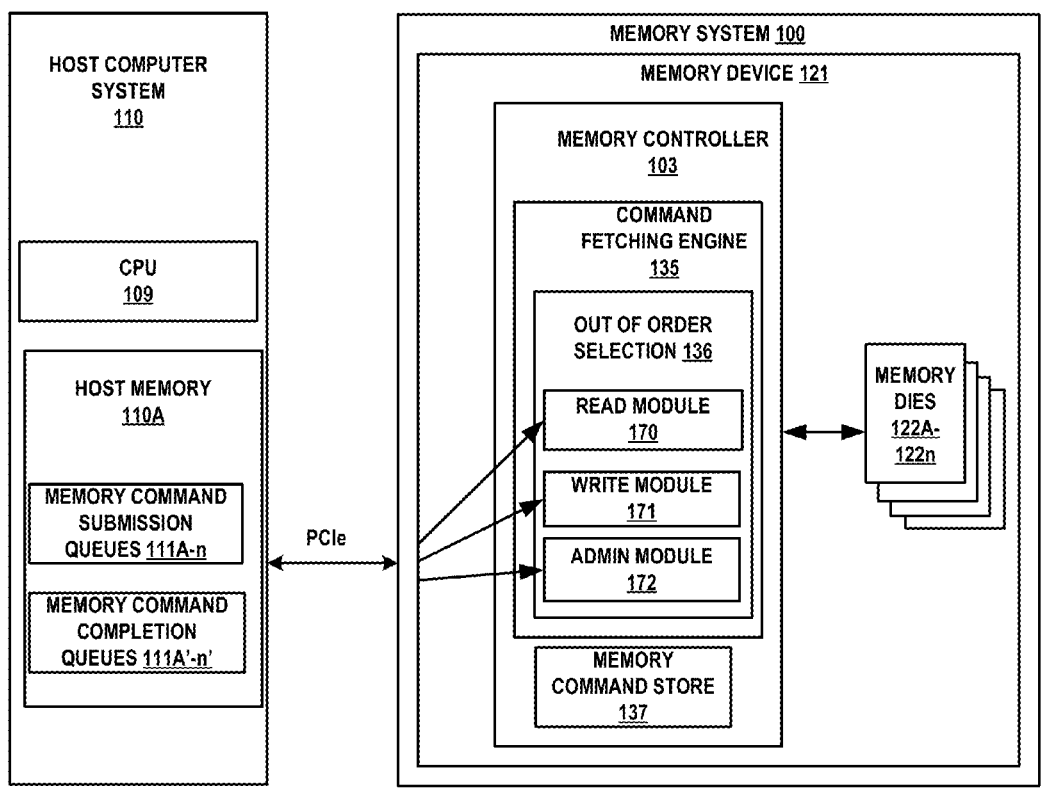
FIG. 4C illustrates host computer system and a memory device, for implementing embodiments of the present disclosure

FIG. 4C illustrates host computer system 110 and a memory device 121, for implementing embodiments of the present disclosure. The host computer system 110 includes a central processing unit (CPU) 109 and a host memory 110A. The host memory 110A including one or more non-volatile memory command submission queues 111A-n and one or more non-volatile memory command completion queues 111A'-n'. The CPU 109 is configured to place non-volatile memory commands in the non-volatile memory command submission queues 111A-n to be executed by the memory device 121 and to send a "doorbell" notification to the memory device that non-volatile memory commands are available for execution in the non-volatile memory command submission queue.

The memory controller 103 includes a command fetching engine 135 and a memory command store 137. The command fetching engine 135 includes an out of order selection module 136 including a read module 170, a write module 171 and an admin module 172. The out of order selection module 136 can examine the non-volatile memory commands in one or more of the host memory command submission queues 111A-n. The out of order selection module 136 parses the command headers (DW0s) of each of the non-volatile memory commands in the one or more of the host memory command submission queues. The out of order selection module 136 can fetch the non-volatile memory commands from a selected one of the host memory command submission queues 111A in an order selected by the out of order selection module that is independent of the order in which the host computer system 110 issued the non-volatile memory commands to the non-volatile memory command submission queues. The fetching order of the non-volatile memory commands can be according to currently available non-volatile memory resources. The out of order selection module places the fetched non-volatile memory commands in the memory command store 137, and executes the non-volatile memory commands the corresponding order. Currently available non-volatile memory resources can include, for example, but not limited to, a number of available flash memory dies 122A-n available to perform a read or a write operation, available error correction code (ECC) modules to encode or decode data, etc.

The read module 170, write module 171 and admin module 172 are responsible to execute read, write and admin commands, respectively. The read module 170, write module 171 and admin module 172 can operate independently of each other and in parallel. The read module 170, write module 171 and admin module 172 can form a buffer between the host non-volatile memory command submission queues 111A-n and the memory dies 122A-n. Each of the read module 170, write module 171 and admin module 172 can examine the non-volatile memory commands in the non-volatile memory command submission queues 111A-n to identify which commands will be fetched according to memory device internal considerations so as to achieve high performance, efficient, execution of non-volatile memory commands. Internal considerations can include data transfer complexity such as may be indicated by a PRP and/or a SGL, power in system, opcode and other considerations such as power and time.

In one exemplary implementation a memory data transfer performance is improved when executing read and write cache commands such as a pipeline read or write page instead of executing multiple, separate read or write page commands. The read module 170 and write module 171 can scan a selected one or more of the non-volatile memory command queues 111A-n for multiple, separate read page or write page commands that source or target from/to same memory die. These identified multiple, separate read page or write page commands can be fetched from one or more of the non-volatile memory command queues 111A-n by the out of order selection module 136 into memory command store 137. The out of order selection module 136 can merge the multiple separate read page or write page commands into a single read or write cached page command to be executed by the memory controller 103 and thus achieving a higher performance data transfer than would be achieved by individually executing each of the multiple separate read page or write page commands.

Similarly, the read module 170, write module 171 and admin module 172 can search for memory commands in one or more of the non-volatile memory command submission queues 111A-n for memory commands directed toward a selected one of the memory dies 122A-n. For example, multiple read or write commands directed to a selected memory die could be combined in a single respective read or write command. The memory device 121 can collect multiple, separate read or write page commands from one or more of the non-volatile memory command submission queues 111A-n that source/target to different memory dies or different planes of the memory dies and merge the multiple separate read or write page commands into a single read or write multiplane command an thus provide improved performance instead of individually executing each separate read or write page command.

Non-volatile memory commands can include read commands such as read page, read page cache (sequential, random), read page multiplane. Non-volatile memory commands can include write commands such as page program, program page cache, program page multiplane. The read and write non-volatile memory commands deal with data transfer from/to memory system 100 such as input/output commands.

Non-volatile memory commands can also include admin commands such as read ID (read memory device internal parameters), read status (execution result of last non-volatile memory operation succeed/failed), reset (reset memory device), erase, get/set features (read/write internal memory device features and memory device operation modes). The admin non-volatile memory commands manage memory device 121 configuration/control/status registers and do not direct or control data transfer from/to memory system 100, e.g., are not input/output commands.

Figure 5:
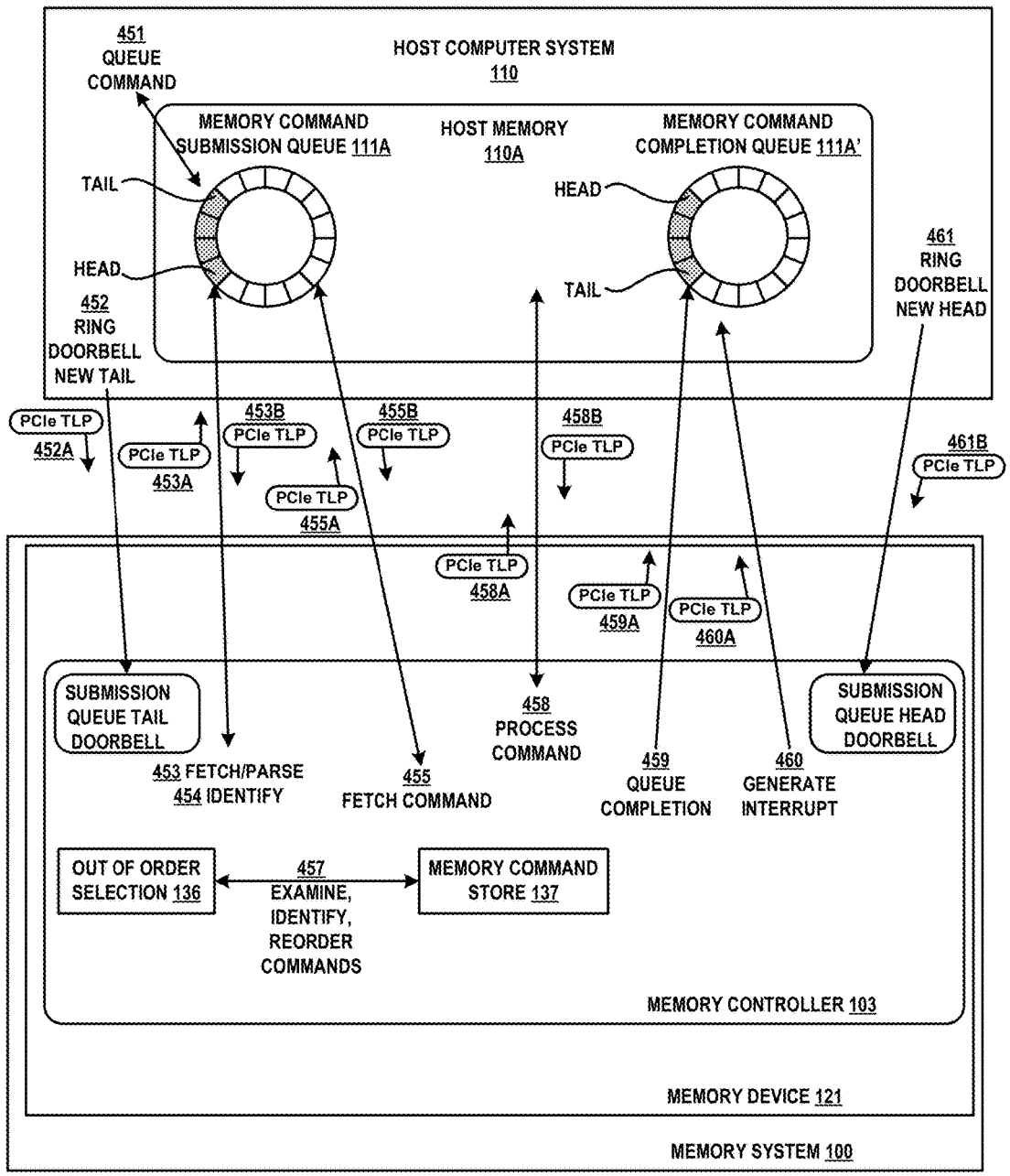
FIG. 5 is a block diagram of the host computer system and the memory device communications using the PCI express (PCIe) communication protocol, for implementing embodiments of the present disclosure.

FIG. 5 is a block diagram of the host computer system 110 and the memory device 121 communications using the PCI express (PCIe) communication protocol, for implementing embodiments of the present disclosure. The PCIe is a system and method for communication between components in a larger computer system. In the present instance, the PCIe is used to communicate between the host computer system 110 and the memory device 121.

In an operation 451, the host computer system 110 issues a non-volatile memory command to the non-volatile memory command submission queue 111A. It should be understood that the host computer system 110 can include more than one non-volatile memory command submission queues 111A-n, as described above, even though only one non-volatile memory command submission queue 111A is shown. The host computer system 110 issues the non-volatile memory command to the memory command submission queue 111A in an order generated by the operations and demands of the host computer system. The non-volatile memory command includes a head (e.g., a beginning) and a tail (e.g., an end).

In an operation 452, the host computer system 110 issues a "doorbell" message in the form of one or more PCIe transaction layer packets (TLP) 452A to the memory device 121 to notify the memory device that a new non-volatile memory command has been issued to the memory command submission queue 111A. The doorbell message is initiated when the tail of the non-volatile memory command has been issued to the memory command submission queue 111 submission.

In an operation 453, the out of order selection module 136 fetches the metadata of the non-volatile memory commands in the memory command submission queue 111A and parses the metadata of each of the non-volatile memory commands. Parsing the metadata allows the out of order selection module 136 to identify which of the non-volatile memory commands in the memory command submission queue 111A correspond to the available non-volatile memory resources in the memory device 121 and differentiate between non-volatile memory commands that may have been fetched in a previous out of order fetch so as to not fetch a memory command that was previously fetched out of order but has not been removed from the memory command queue.

In one implementation, the out of order selection module 136 identifies which of the non-volatile memory commands in the non-volatile memory command submission queue 111A correspond with currently available, non-volatile memory resources, in an operation 454. Identifying the corresponding non-volatile memory commands can also include determining a priority of the non-volatile memory commands that corresponds to an order of availability of the non-volatile memory resources.

In an operation 455, the out of order selection module 136 fetches the non-volatile memory commands from the non-volatile memory command submission queue 111A in the order of priority corresponding to the currently available non-volatile memory resources. The fetch can be in the form of one or more PCIe TLPs 455A. The fetched non-volatile memory command is fetched from the non-volatile memory command submission queue 111A in the form of one or more PCIe TLPs 455B. The fetched the non-volatile memory commands are placed in the memory command store 137 in the order the non-volatile memory commands were fetched from the non-volatile memory command submission queue 111A. The memory device 121 also records the identity of the fetched non-volatile memory command so that the memory device and identify which of the non-volatile memory commands have been fetched and which non-volatile memory commands have yet to be fetched since the commands are fetched out of order and not in a first in first out (FIFO) manner.

In another implementation, the memory device 121 fetches the non-volatile memory commands from multiple selected non-volatile memory command submission queues 111A-n, in operation 453. The fetch can be in the form of one or more PCIe TLPs 453A. The fetched non-volatile memory commands are fetched from the non-volatile memory command submission queues 111A-n in the form of one or more PCIe TLPs 453B. The fetched the non-volatile memory commands are placed in the memory command store 137. In an operation 457, the out of order selection module 136 identifies which of the fetched non-volatile memory commands in the memory command store 137 correspond with currently available, non-volatile memory resources. The out of order selection module 136 can also reorder the non-volatile memory commands placed in the memory command store 137 to correspond to the currently available non-volatile memory resources.

In an operation 458, the fetched non-volatile memory command is executed and any resulting data transfers between the memory device 121 and the host computer system 110 are in the form of one or more PCIe TLPs 458A, 458B. For example, data to be stored in the memory system is transferred to the memory device 121 as PCIe TLPs 458A. Similarly, any data retrieved from the memory system 100 is transferred to the host computer system 110 as PCIe TLPs 458B.

In an operation 459, the memory device 121 issues one or more PCIe TLPs 459A to the host computer system 110 when the execution of the fetched non-volatile memory command is completed to notify the host computer system that the fetched non-volatile memory command has been executed. The notification that the fetched non-volatile memory command has been executed can be stored in one or more of the memory command completion queues 111A'-n'.

In an operation 460, the memory device 121 issues one or more PCIe TLPs 460A to the host computer system 110 as an interrupt. The interrupt notifies the host computer system 110 that one or more of the memory command completion queues 111A'-n' have been updated by the memory device 121 and there are pending completion entries.

The non-volatile memory command submission queue 111A is presented as a circular queue as the process of issuing and fetching the non-volatile memory commands into and from, respectively, the non-volatile memory command submission queue 111A is a substantially continuous process. By way of example, in an operation 461, the host computer system 110 issues a doorbell message as one or more PCIe TLPs 461B to notify the memory device 121 that a new non-volatile memory command head is being issued to the memory command queue 111. The data communications between the host computer system 110 and the memory device 121 are described above with regard to PCI express protocols and more specifically PCIe TLPs, it should be understood that these descriptions are exemplary implementations only and any suitable data communication protocol (s) and data bus system(s) can be used to couple the data communications between the host computer system and the memory device.

In one implementation, each of the memory dies 122A-n perform a single operation at any given time. For example, the memory dies 122A-n can include eight memory dies. The memory controller 103 has caused four memory dies to be performing write operations, two memory dies to be performing read operations and one memory die to be performing an administrative operation such as a check status. The eighth memory die is idle.

The out of order selection module 136 scans the non-volatile memory commands issued to the non-volatile memory command submission queues 111A-n for a memory command that will optimize the use of the available non-volatile memory resources (e.g., the idle eighth memory die, as an example). There can be many parameters that determine which one of the memory commands in the submission queue will be most optimal at the time the out of order selection module 136.

Using the above example with four memory dies executing writing operations, power may be a consideration as writing operations often consume more power and time than other operations. Therefore, if power consumption was a consideration or if time is a consideration, the out of order selection module 136 would scan through the issued commands in the non-volatile memory command submission queue looking for memory commands that consume very little power and/or very little time to complete. For example, a write operation that is only writing a small amount of data, a read operation, or a check status operation, as each of those operations consume relatively small amounts of power and relatively small amounts of time. The out of order selection module 136 would selectively fetch the corresponding non-volatile memory command. In contrast a block erase or a writing operation would require more power and time to complete.

Again using the above example with an idle memory die, the out of order selection module 136 would scan through the issued non-volatile memory commands in one or more of the non-volatile memory command submission queues 111A-n looking for one or more non-volatile memory commands that would place the idle memory die in operation. Such one or more non-volatile memory commands could be a read operation, a write operation or a check status operation. The out of order selection module 136 would selectively fetch the corresponding non-volatile memory commands from one or more of the non-volatile memory command submission queues 111A-n.

Again using the above example, with two memory dies performing reading operations and one memory die performing a check status operation, the out of order selection module 136 would scan through issued non-volatile memory commands in the non-volatile memory command submission queues 111A-ns looking for one or more non-volatile memory commands that could be issued as soon as the reading or the check status operations are completed in the respective memory dies. The out of order selection module 136 would selectively fetch the corresponding non-volatile memory commands from one or more of the non-volatile memory command submission queues 111A-n.

The ability to selectively scan and fetch the non-volatile memory commands in the non-volatile memory command submission queues 111A-n allows the memory command store 137 in the memory controller 103 to be a minimal size. Thus allowing the memory device 121 to be somewhat simpler and less expensive to produce. The present disclosure allows the memory devices to be simpler and less expensive to produce while simultaneously also allowing the memory devices to operate more efficiently in executing the memory commands issued by the host computer system.

Figure 6:
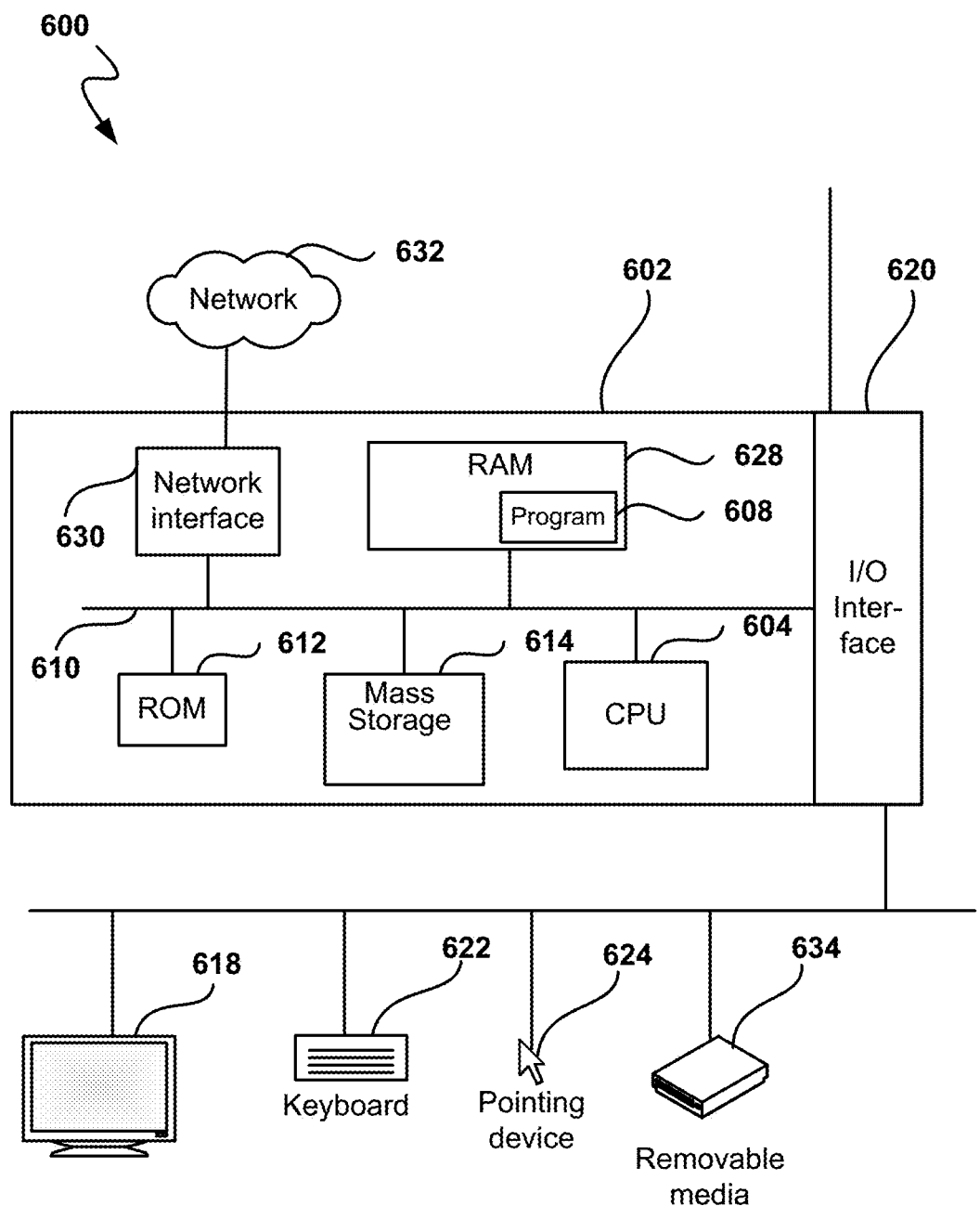
FIG. 6 is a block diagram of an example computer system, for implementing embodiments of the present disclosure.

FIG. 6 is a block diagram of an example computer system 600, for implementing embodiments of the present disclosure. A general or specialized computer system, such as the computer system 600 and used for executing the operations for performing at least a portion of the processes described above such as the host computer system 110. The computer system 600 includes a computer 602, a display 618, an optional printer or output device (not shown), a removable media (e.g., magnetic/optical/flash) drive 634, a mass storage system 614 (e.g., hard disk drive, solid state drive, or other suitable data storage device), a network interface 630, and a keyboard 622. Additional user interface devices such as a mouse 624, a touch pad or touch screen can also be included. One or more of the memory systems 100 can be included in one or both of the removable media (e.g., magnetic/optical/flash) drive 634 and/or the mass storage system 614 (e.g., hard disk drive, solid state drive, or other suitable data storage device).

The computer 602 includes a central processing unit 604, one or more data buses 610, random access memory (RAM) 628, read only memory (ROM) 612, and an input/output interface 620. The computer 602 can be a personal computer (such as an IBM compatible personal computer, a Macintosh computer or Macintosh compatible computer), a workstation computer (such as a Sun Microsystems or Hewlett-Packard workstation), or some other suitable type of computer.

The CPU 604 can be a general purpose digital processor or a specially designed processor. The CPU 604 controls the operation of the computer system 600. Using instructions retrieved from memory (e.g. program(s) 608), the CPU 604 controls the reception and manipulation of input data and the output and display of data on output devices.

The data buses 610 are used by the CPU 604 to access the RAM 628, the ROM 612 and the mass storage 614. The RAM 628 is used by the CPU 604 as a general storage area and as scratch-pad memory, and can also be used to store input data and processed data. The RAM 628 and the ROM 612 can be used to store computer readable instructions or program code 608 readable and executable by the CPU 604 as well as other data.

The bus 610 can also be used to access the input, output, and storage devices used by the computer 602. These devices include the display 618, the optional printer (not shown), the removable media drive 634, and the network interface 630. The input/output interface 620 is used to receive input from keyboard 622 and send decoded symbols for each pressed key to CPU 604 over the data bus 610.

The display 618 is an output device that displays images of data provided by the CPU 604 via the bus 610 or provided by other components in the computer system 600. The optional printer device, when operating as a printer, provides an image on a sheet of paper or a similar surface. Other output devices such as a plotter, projector, etc. can be used in place of, or in addition to, the printer device.

The removable media drive 634 and the mass storage 614 can be used to store various types of data. The removable media drive 634 facilitates transporting such data to other computer systems, and mass storage 614 permits fast access to large amounts of stored data. The mass storage 614 may be included within the computer system or may be external to the computer system such as network attached storage or cloud storage accessible over one or more networks (e.g., local area networks, wide area networks, wireless networks, Internet 632) or combinations of such storage devices and locations.

The CPU 604 together with an operating system operate to execute computer readable code and logic and produce and use data. The computer code, logic and data may reside within the RAM 628, the ROM 612, or the mass storage 614 or other media storage devices and combinations thereof. The computer code and data could also reside on a removable program medium and loaded or installed onto the computer system 600 when needed. Removable program media include, for example, DVD, CD-ROM, PC-CARD, floppy disk, flash memory, optical media and magnetic disk or tape.

The network interface 630 is used to send and receive data over a network 632 connected to other computer systems. An interface card or similar device and appropriate software implemented by the CPU 604 can be used to connect the computer system 600 to an existing network and transfer data according to standard protocols such as local area networks, wide area networks, wireless networks, Internet and any other suitable networks and network protocols.

The keyboard 622 is used by a user to input commands and other instructions to the computer system 600. Other types of user input devices can also be used in conjunction with the present invention. For example, pointing devices such as a computer mouse, a track ball, a stylus, touch pad, touch screen or a tablet can be used to manipulate a pointer on a screen of a general-purpose computer.

It will be further appreciated that the instructions represented by the operations in the above figures are not required to be performed in the order illustrated, and that all the processing represented by the operations may not be necessary to practice the invention. It should also be appreciated that some operations may have sub-operations and in other instances, certain operations described herein may not be included in the illustrated operations. Further, the processes described in any of the above figures can also be implemented in software stored in any one of or combinations of the RAM, the ROM, or the hard disk drive.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations can be envisioned wherein some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

One of skill in the art will recognize that this invention is not limited to the two dimensional and three dimensional exemplary structures described but cover all relevant memory structures within the spirit and scope of the invention as described herein and as understood by one of skill in the art.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A memory device, comprising:
   physical memory device resources for executing memory commands in the memory device;
   a command fetching engine configured to:
   determine availability of the physical memory device resources for executing memory commands in the memory device;
   fetch memory commands from a submission queue of a host computing system for execution in the memory device, wherein fetching the memory commands comprises:
   examining respective memory commands within the submission queue to determine whether physical memory device resources required for execution of the respective commands in the memory device are satisfied by the determined availability of the physical memory resources in the memory device, prior to fetching the respective commands from the submission queue, and
   fetching selected memory commands from the submission queue in response to determining that the physical memory device resources required for execution of the selected commands are satisfied by the determined availability of the physical memory device resources in the memory device; and
   identify physical memory device resources required for execution of a first memory command by:
   partially fetching the first memory command from the submission queue of the host computing system, wherein partially fetching the first memory command comprises transferring a first portion of the first memory command to the memory device without transferring a second portion of the first memory command to the memory device; and
   parsing the first portion of the first memory command at the memory device; and a memory controller configured to execute the fetched memory commands by use of the physical memory device resources in the memory device.

2. The memory device-of claim 1, wherein the command fetching engine comprises a read module configured to:
   identify physical memory device resources that are currently available for executing read commands in the memory device;
   examine respective read commands in the submission queue to identify physical memory device resources required for execution of the respective read commands in the memory device; and
   select a read command to fetch from the submission queue in response to matching required physical memory resources of the selected read command to one or more of the physical memory device resources identified as being currently available for executing read commands in the memory device.

3. The memory device-of claim 1, wherein the command fetching engine comprises a write module configured to:
   identify physical memory device resources that are currently available for executing write commands in the memory device;
   respective write commands in the submission queue to identify physical memory device resources required for execution of the respective write commands in the memory device; and
   select a write command to fetch from the submission queue in response to determining that the required physical memory device resources of the selected write command correspond to one or more of the physical memory device resources of the memory device identified as being currently available for executing write commands in the memory device.

4. The memory device-of claim 1, wherein:
   the determined availability of the physical memory device resources of the memory device indicates that each of a first memory plane and a second memory plane of the memory device are currently available for executing memory commands in the memory device; and
   fetching the memory commands from the submission queue further comprises:
   selecting a first memory command to fetch from the submission queue in response to determining that the required physical memory device resources of the first memory command correspond to the first memory plane, and
   selecting a second memory command to fetch from the submission queue in response to determining that the required physical memory device resources of the second memory command correspond to the second memory plane.

5. The memory device of claim 4, wherein the command fetching engine is further configured to:
   merge the first memory command and the second memory command into a single multiplane memory command for execution on both of the first memory plane and the second memory plane; and
   fetch the single multiplane memory command for execution in the memory device.

6. The memory device of claim 5, wherein the first memory command comprises a first single-plane read command, the second memory command comprises a second single-plane read command, and the single multiplane memory command comprises a single multiplane read command.

7. The memory device of claim 5, wherein the first memory command comprises a first single-plane write command, the second memory command comprises a second single-plane write command, and the single multiplane memory command comprises a single multiplane write command.

8. The memory device of claim 5, wherein the first memory command comprises a first admin command, the second memory command comprises a second admin command, and the single multiplane memory command comprises a single multiplane admin command.

9. The memory device of claim 4, wherein the command fetching engine determines that the first memory command corresponds to the first memory plane in response to translating a logical block address of the first memory command to a physical block address within the first memory plane.

10. The memory device-of claim 1, wherein:
the determined availability of the physical memory device resources in the memory device identify a memory die of a plurality of memory die that is currently available for executing memory commands in the memory device, and
fetching the memory commands from the submission queue further comprises:
fetching a first memory command from the submission queue in response to determining that a logical address associated with the first memory command corresponds to a physical address of the identified memory die, and
deferring fetching of a second memory command from the submission queue in response to determining that a logical address associated with the second memory command corresponds to a physical address of a memory die other than the identified memory die.

11. The memory device-of claim 1, wherein:
the command fetching engine is further configured to identify a memory die that is currently being used to implement a low-latency operation in the memory device and a memory die that is currently being used to implement a high-latency operation in the memory device; and
fetching the memory commands from the submission queue further comprises:
fetching a first memory command to the memory device from the submission queue in response to determining that the first memory command corresponds to the memory die that is currently implementing the low-latency operation,
wherein a second memory command that corresponds to the memory die that is currently implementing the high-latency operation and is ordered before the first memory command in the submission queue is fetched from the submission queue after fetching the first memory command.

12. A memory device, comprising:
physical memory device resources for executing memory commands in the memory device;
a command fetching engine configured to:
determine availability of the physical memory device resources for executing memory commands in the memory device; and
fetch memory commands from a submission queue of a host computing system for execution in the memory device, wherein fetching the memory commands comprises:
examining respective memory commands within the submission queue to determine whether physical memory device resources required for execution of the respective commands in the memory device are satisfied by the determined availability of the physical memory resources in the memory device, prior to fetching the respective commands from the submission queue, and
fetching selected memory commands from the submission queue in response to determining that the physical memory device resources required for execution of the selected commands are satisfied by the determined availability of the physical memory device resources in the memory device, wherein:
the command fetching engine determines a current power consumption of the memory device based on one or more memory commands being executed in the memory device; and
fetching the memory commands from the submission queue further comprises:
determining power requirements of the respective memory commands within the submission queue, and
selecting memory commands to fetch from the submission queue based on the determined power requirements of the respective commands and the current power consumption of the memory device; and
a memory controller configured to execute the fetched memory commands by use of the physical memory device resources in the memory device.

13. A memory device, comprising:
physical memory device resources for executing memory commands in the memory device;
a command fetching engine configured to:
determine availability of the physical memory device resources for executing memory commands in the memory device; and
fetch memory commands from a submission queue of a host computing system for execution in the memory device, wherein fetching the memory commands comprises:
examining respective memory commands within the submission queue to determine whether physical memory device resources required for execution of the respective commands in the memory device are satisfied by the determined availability of the physical memory resources in the memory device, prior to fetching the respective commands from the submission queue, and
fetching selected memory commands from the submission queue in response to determining that the physical memory device resources required for execution of the selected commands are satisfied by the determined availability of the physical memory device resources in the memory device, wherein:
the determined availability of the physical memory device resources of the memory device indicates that the memory device is currently executing one or more memory commands associated with high power consumption; and
fetching the memory commands from the submission queue further comprises:
selecting a first memory command to fetch from the submission queue in response to determining that the first memory command is one of a read command and an admin command, and preventing a second memory command from being fetched from the submission queue in response to determining that the second memory command is one of a write command and an erase command; and a memory controller configured to execute the fetched memory commands by use of the physical memory device resources in the memory device.

14. The memory device-of claim 1, wherein fetching the memory commands from the submission queue further comprises:

identifying two or more memory commands within the submission queue that correspond to one or more of a same memory die and a same memory plane;

combining the two or more memory commands into a single memory command prior to fetching the two or more memory commands from the submission queue; and transferring the single memory command to the memory device.

15. The memory device of claim 14, wherein the single memory command comprises one of a read cached page command and a write cached page command.

16. A memory system, comprising:

a memory array comprising a plurality of memory die;

a translation engine configured to convert logical addresses to corresponding physical addresses within respective memory die of the memory array;

a command fetching engine communicatively coupled to a host queue through a bus, the command fetching engine configured to:

identify idle memory die of the memory array that are currently available for memory command execution, partially fetch memory commands from the host queue, wherein partially fetching a memory command comprises accessing designated portions of respective memory commands through the bus without accessing one or more other portions of the respective memory commands, map the respective memory commands to respective memory die of the memory array using the translation engine and the designated portions of the partially fetched memory commands, identify memory commands within the host queue that map to idle memory die of the memory array that are currently available for memory command execution, and fetch one or more of the identified memory commands from the host queue; and a controller configured to execute the memory commands fetched from the host queue using one or more of the memory die.

* * * * *